United States Patent [19]

Johnson

[11] Patent Number: 4,991,726

[45] Date of Patent: * Feb. 12, 1991

[54] SUPPORT STAND

[76] Inventor: David W. Johnson, 2601 Hoover St., Ste. H,, National City, Calif. 92050

[*] Notice: The portion of the term of this patent subsequent to Dec. 29, 2004 has been disclaimed.

[21] Appl. No.: 231,379

[22] Filed: Aug. 12, 1988

[51] Int. Cl.⁵ ............................................. A47B 47/00
[52] U.S. Cl. ..................................... 211/189; 211/205; 446/106; 273/160; 362/367
[58] Field of Search ................... 211/74, 189, 105, 85, 211/182, 126, 205; 403/219, 364; 446/106; 273/160; 52/667, 646, 648; D6/467; D7/71; 362/367

[56] References Cited

U.S. PATENT DOCUMENTS

| 1,542,148 | 6/1925 | Kramariuk | 273/160 |
| 4,715,503 | 12/1987 | Johnson | 211/189 X |
| 4,809,146 | 2/1989 | Johnson | 211/189 X |
| 4,825,620 | 5/1989 | Johnson | 211/189 X |

Primary Examiner—Blair M. Johnson
Attorney, Agent, or Firm—Ralph S. Branscomb

[57] ABSTRACT

A support stand is formed from three orthogonally oriented intersecting slat pairs, with the joints at this intersection and also spaced along the support stand being of a special interlocking construction which creates a quite rigid joint in all dimensions of possible movement without the use of any fasteners or adhesive. Although the possible manifestations of products using the basic stand construction are quite varied, the illustrated embodiments include a support rack or "tree", a table, and a lamp.

13 Claims, 4 Drawing Sheets

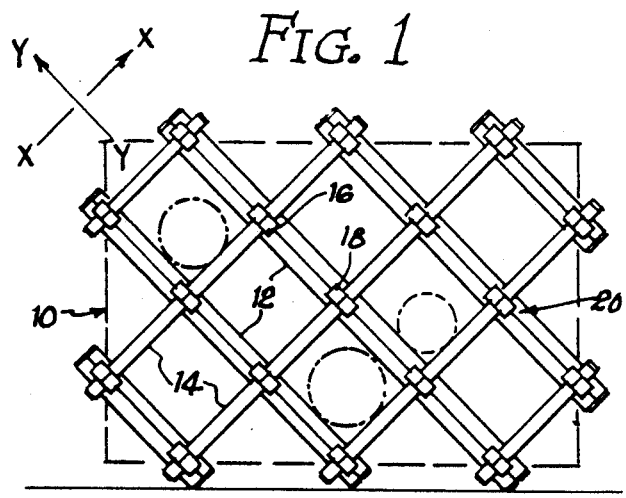
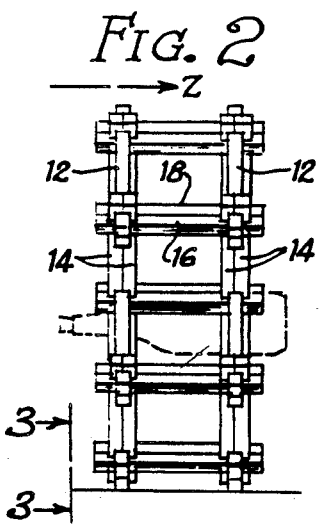
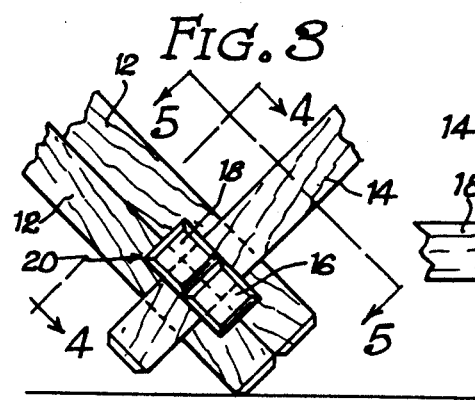
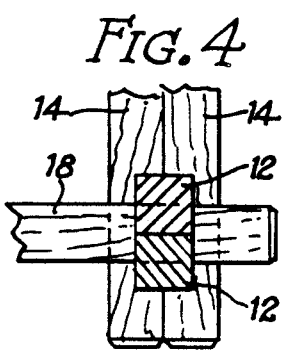
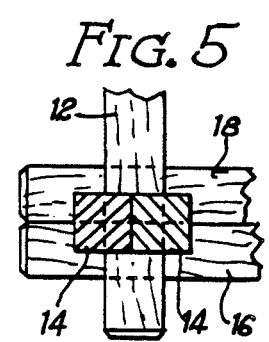
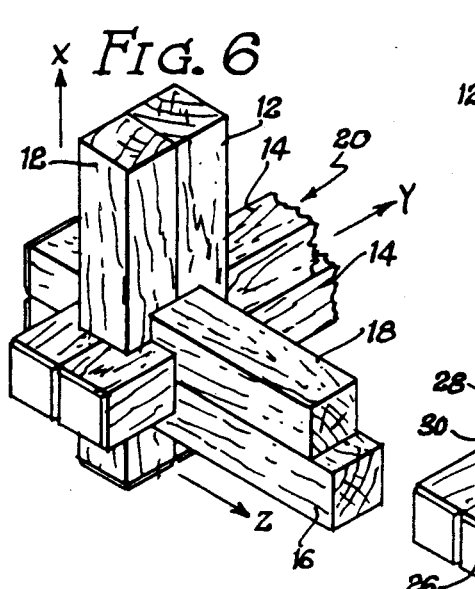
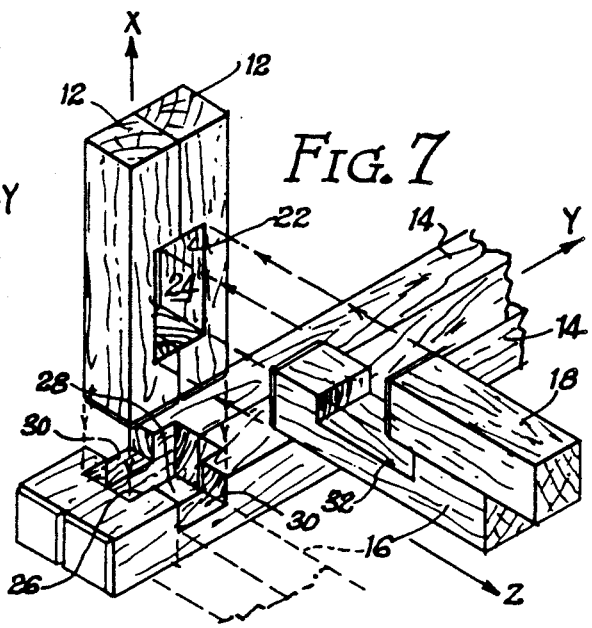

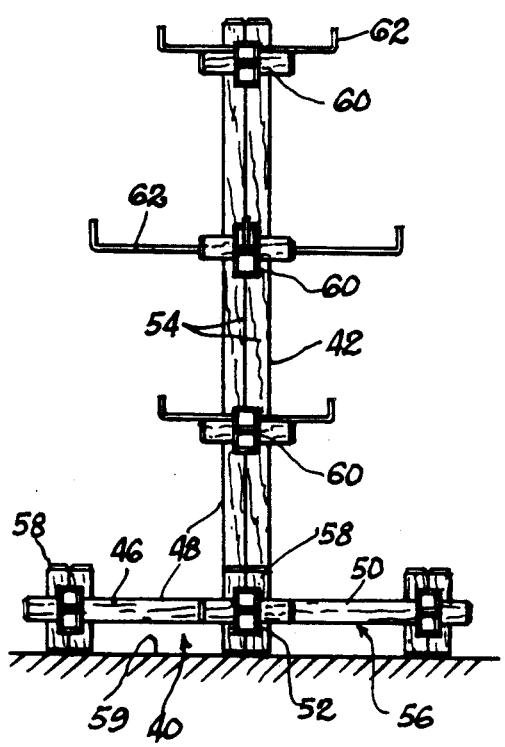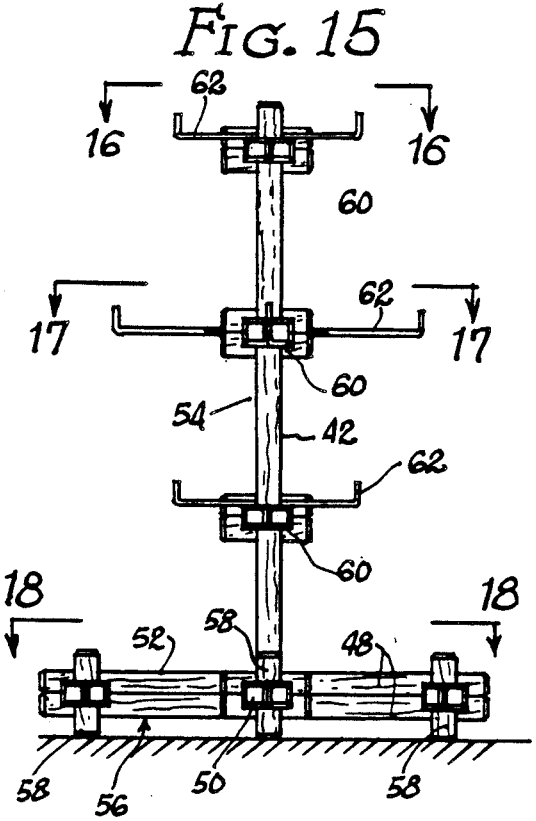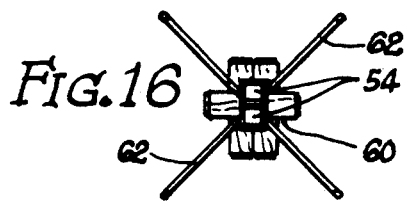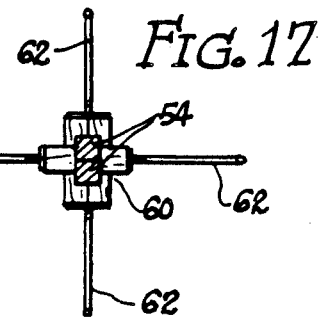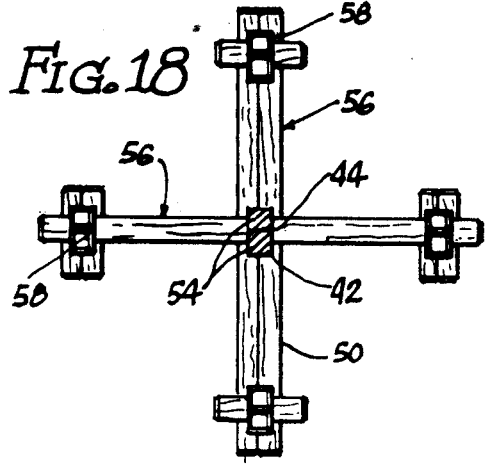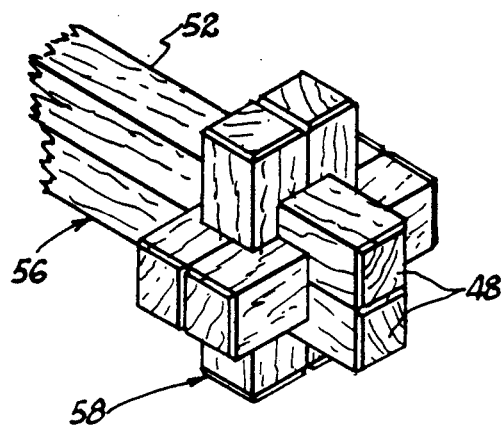

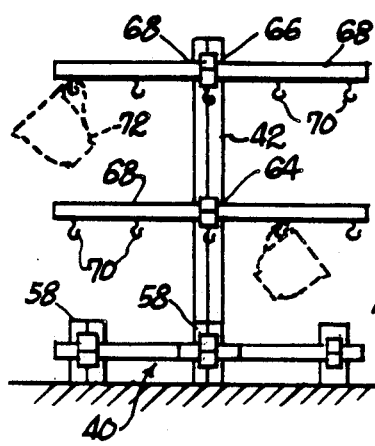
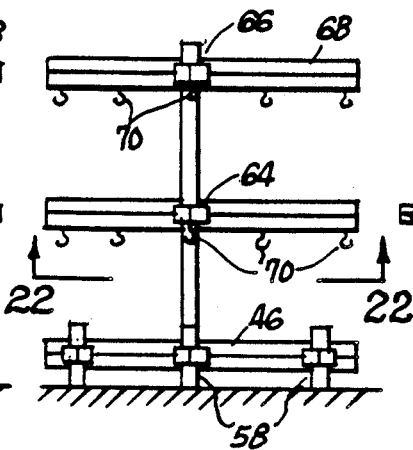
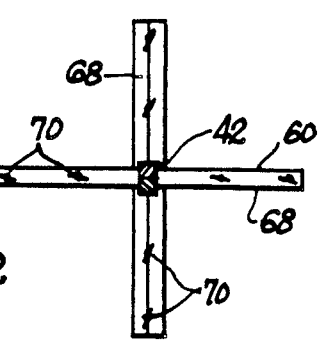
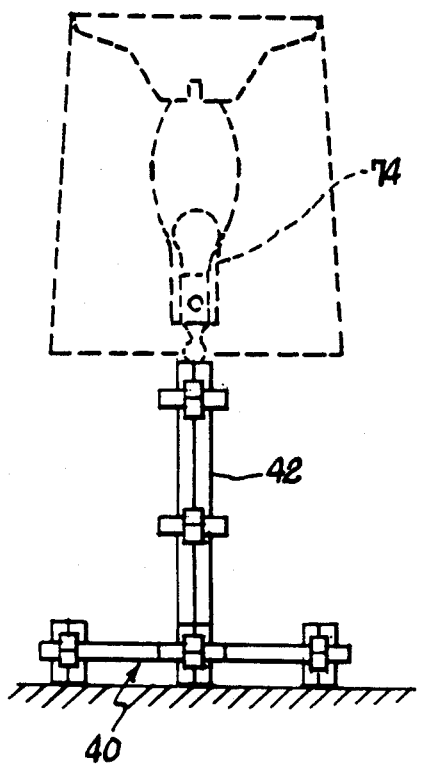
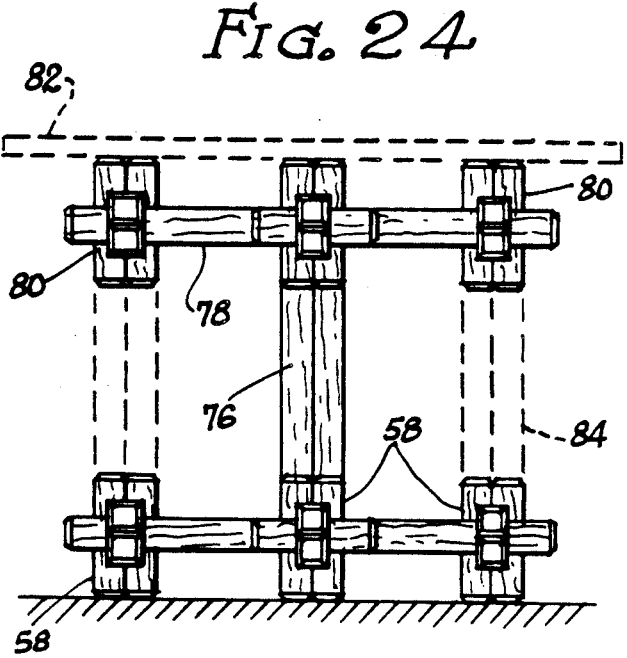

SUPPORT STAND

BACKGROUND OF THE INVENTION

The instant invention is a continuation-in-part application of application Ser. Nos. 137,100 and 137,101, now U.S. Pat. No. 4,809,146, both filed on Dec. 23, 1987 and both being invented and filed by David W. Johnson, who is the inventor of the instant invention, and both of the devices of those patent applications, being a STRUCTURAL SUPPORT and an ENCLOSURE, respectively, being continuations-in-part of Ser. No. 848,573, filed Apr. 7, 1986, which issued into U.S. Pat. No. 4,715,503, issued Dec. 29, 1987, to David W. Johnson, for an INTERLOCKING JOINT WINE RACK.

The parent patent to the two prior cases, that is, the INTERLOCKING JOINT WINE RACK patent, described a lattice constructed of interlocking joints utilizing no fasteners or adhesives which was described as being generally applicable to a variety of different structures, but was specifically claimed as a wine rack.

Ser. No. 137,100 extrapolated the basic construction of the wine rack into a structural support such as a beam, girder, or post which is used not for its attractive appearance or its ability to hold objects, but for its strength, and more specifically for its high strength-to-weight ratio.

Ser. No. 137,101 modified the basic construction of the wine rack to form a box-shaped enclosure which has a variety of different product implementations.

The instant invention, the SUPPORT STAND, is yet another basic application of the same basic construction in which, rather than forming either a beam, a box, or a wine rack, a basic support stand is created, which is usefully formed into a variety of different products.

The peculiar nature of the lattice structure on which the prior three patents were based had its genesis in the joint, each of which joint is the same as each of the other joints. The joint is fabricated from six members, there being two contiguous members running in each of the three physical dimensions, with the result that a very rigid joint is produced which resists all twisting, turning and bending movements in all dimensions.

The great advantage of this joint lies not in the fact that its use saves fasteners and adhesives, but rather in the fact that it can be constructed out of identical elongated members which differ from one another only in the notches that are cut in them, there being three different configurations of the member at the joint area, one of which is full-notched, the second of which is both full-notched and half-notched, and the third of which has no notches at all.

Therefore, the construction naturally lends itself to the use of materials which may have great structural strength but which may be difficult, according to today's technology, to bond together to create structural members more complex than straight runs without sacrificing strength.

For example, the nature of steel is such that a weldment between two steel members, if performed correctly, is as strong as the metal itself. However, this is not true of aluminum, which can be welded but producing a satisfactory weldment is often very difficult. This is also not true of Nylon and many other forms of plastic which are quite tough and structurally strong, but must be used in their originally extruded shape, as a general rule, because more complex shapes achievable by bonding will partially lose the original strength advantage of the material because of the weakness of the bonding points. Whether this will be true in the future is, of course, not known as more adhesives are created and improved fabrication techniques are discovered, but it is certainly the case at this point in time.

Because of the nature of the joint construction of the support stand described in the instant invention, however, any material which may be formed by an extrusion and then subjected to the milling of notches, such as Nylon, aluminum, and just about any plastic, can be fabricated into a lattice of virtually any desired length, width and height dimension with any number of joints without requiring welding or bonding whatsoever. This is true also for other materials including wood.

For this reason, virtually any structural material that is reasonably light in weight can be assembled easily into support stands. Producing the slats with the appropriate notches for creating the stand can be done with relatively unskilled labor once basic jigs and tooling have been made, and assembling of the support stands can be done using unskilled labor with no special tools.

SUMMARY OF THE INVENTION

The support stand of the instant invention comprises, in its most basic form, a cross support base defining four extended legs, and a central support post which extends upright from the center of the cross base. The two cross members which define the four legs, and the upright post, each comprise a pair of elongated structural members which intersect to define the main joint, and additional joints are variously defined at the ends of the legs and along the post.

The joints, which are at the heart of the invention, are described in more detail in the Detailed Description. Basically, each joint constitutes six members in three two-member pairs, the members in each pair being adjacent and parallel. The members in the first pair have facing notches cut that together define the cross-sectional area of two of the members, and in the second pair a notch identical to those notches in the first pair are created and another, additional notch is cut at a 90 degree angle into the first notch and is half as wide as the first notch, and the last pair of members consists of one member which has no notches at all, and another member which has a full notch as the first pair. A minor variation of this construction is disclosed in which there are no voids created in the assembled joint, as a small void is created by the above-described configuration.

Once the joint is understood, it can be seen that it can be replicated a number of times in a number of different configurations in the support stand. In addition to the basic joint that in used to join all of the members together to define the base and the upright post, joints are used to define feet on the legs of the base, to hold the individual members of the member pairs together, and, with various members extended, support arms are formed in identical fashion to the legs of the support base.

BRIEF DESCRIPTION OF THE DRAWINGS

FIG. 1 is a front elevation view of a wine rack made from the lattice construction;

FIG. 2 is a side elevational view of the wine rack of FIG. 1 illustrating a bottle of wine as it would rest in the rack;

FIG. 3 is a front elevational view of a typical bottom joint of the rack and of the lattice in general;

FIGS. 4 and 5 are sections taken respectively along lines 4—4 and 5—5 of FIG. 3;

FIG. 6 is an isometric view of a typical joint;

FIG. 7 is an exploded view of the joint illustrated in FIG. 6 making it possible to understand how the members interlock to form the joint;

FIG. 14 is a front elevation view of the invention in its embodiment as a hanging rack or "tree";

FIG. 15 is a side elevation view the tree of FIG. 14;

FIG. 16 is taken along line 16—16 of FIG. 15 showing the top portion of the stand only, with a tier of diagonal hooks showing;

FIG. 17 is taken along line 17—17 of FIG. 15 showing an intermediate portion with diagonal hooks;

FIG. 18 is taken along line 18—18 of FIG. 15 and shows the base portion;

FIG. 19 is an isometric view of a detail of the structure showing one of the foot joints, which typifies all the joints of the invention;

FIG. 20 is a front elevation view of a modification of the invention in which it defines a cup rack;

FIG. 21 is a side elevation view of the cup rack of FIG. 20;

FIG. 22 is taken along line 22—22 of FIG. 21, looking upward;

FIG. 23 is a front elevation view of a lamp embodiment of the invention; and

FIG. 24 is a side elevation view of an embodiment in which the stand is used as a table base, with optional support legs shown in phantom.

DETAILED DESCRIPTION OF THE PREFERRED EMBODIMENT

In order to understand the construction of the Support Stand disclosed and claimed herein, it is necessary to understand the joint that is central to its construction. To understand the joint, the discussion pertaining to the lattice construction of the wine rack of the original parent patent is repeated herein.

Figure 12:
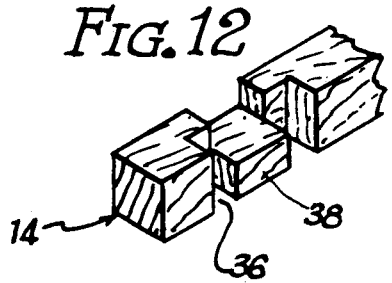
FIG. 12 is an isometric view of a modified slat with an E-type configuration so that the internal void of the joint is filled as shown in FIG. 9.

The three dimensional lattice is best understood by labeling the directions in which the various members extend in a wine rack, so as indicated in FIG. 1, the X and Y axes align with the directions that the members extend that define the front of the wine rack, and the depth is established by the Z direction, indicated in FIG. 2. The same type of construction could clearly be used in a similar structure illustrated in FIG. 13 as it generally would be when used as a structural member, in which the matrix is upright, rather than being tilted 45 degrees as in FIG. 1. The configuration of the wine rack of FIGS. 1 and 2, is such that, as it is made tilted 45 degrees from the upright as shown in FIG. 12, all peripheral joints of the wine rack align with the sides of the rectangle, illustrated in part at 10.

The lattice of the rack is defined from only four different types of members in the preferred embodiment. Although they are all similar pieces of hardwood rectangular millstock, sanded, polished and finished to produce a fine piece of furniture, in order to clarify the explanation and description, the members are given arbitrary distinguishing names which correspond with the above-mentioned directions in three dimensions in which the members run. Members running in the X direction are called "laths", and are indicated at 12, "slats" 14 run in the Y direction, and "posts" 16 and 8 run in the Z direction (there are two different kinds of posts).

All of the joints 20 are identical, in the configuration, orientation and cutting of the members that define the joints. Thus, to understand the construction of the unit, first the construction of a single joint will be described, and then the organization of lattice as illustrated in the wine rack as a whole will be set forth, and then construction of the structural support is described.

Turning to FIG. 7, the basic element of the X direction is the lath 12, and two of these laths together form the structural member than extends in the X direction.

The two laths in FIG. 7 each has what is referred to as a "full notch 22," this terminology referring to a notch, which when paired with an oppositely directed notch, as shown in FIG. 7 defines a passthrough opening 24 for a pair of members which will snugly fit into the opening when inserted orthogonally therethrough. This opening is referred to as a "Z-passthrough opening" in the claims, because the opening will pass through members which run in the Z direction.

Still referring to FIG. 7, the slats 14 running in the Y direction also have full notches 26 which define a X-passthrough opening 28, through which passes the pair of laths 12, indicated exploded away from the opening in FIG. 7. The slats 14 also each have a half-notch 30, which is half the width of the full notch 22. The half-notches 30 are orthogonally related to the main notches 26 and are midway located in the full notch and define a pass through opening in the Z direction.

Finally, the post 16, extending the Z direction, has a full notch 32. The other post 18, which is the "key" post, is not notched at all, but is a straight piece of square millstock.

The way in which the members fit together to form the joint is as follows: The laths 12 are inserted down through the opening 28 (or in actuality, the slats 14 are placed around the laths so that the opening 28 embraces the laths), so that the opening 24 defined by the laths extends down sufficiently below the opening 28 of the slats to permit the post 16 to be slid into the opening 24 beneath the slats 14. With the slats 14 compressed together, they are then fitted down into notch 32 of the post 16, so that the notch 32 embraces the two laths 14 and holds them together. The post 16 would then extend from the slats 14 as indicated in phantom in FIG. 7.

Thus, there is nothing left but a straight Z-passthrough opening for the "key" post 18 to fit into as shown in FIG. 7. Once the key post is in place, the slats 14 can no longer be raised to release the underlying post 16, and thus there is a locked, rigid orthogonal joint. Conversely, by slipping out the key post 18 (which in the preferred form of the invention makes a very tight press fit), the slats 14 can be lifted up out of the notch 32, to permit the post 16 to be slid longitudinally out of the opening 24, freeing the slats and laths to be separated.

Turning now to the overall construction, the matrix illustrated in FIGS. 1 and 2 is formed from an X-directional parallel array of laths, a Y-directional parallel array of slats, and a Z-directional parallel array of posts.

There are only two type of cuts that need to be made in any of the structural members of the lattice. First, the full-sized notch cut, which is made in all the members except for the key post 18. Second the half-notch, which is made after the full-sized notch is made in the slats and in the post 16. With the proper jigs and tooling, obviously these cuts can be very simply and economically made.

Figure 8:
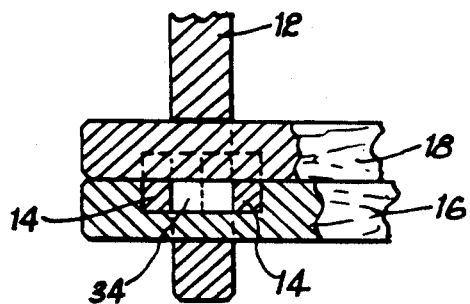
FIG. 8 illustrates the internal void of the joint utilizing the preferred method of construction.
Figure 9:
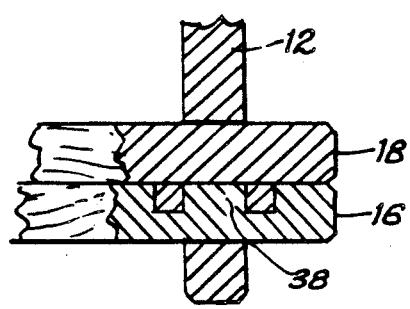
FIG. 9 is identical to FIG. 8, illustrating the way in which the internal void is filled by utilizing slats of the modified version illustrated in FIG. 12.
Figure 10:
FIG. 10 is a plan view illustrating the three different sizes and types of pieces used in construction of the wine rack.
Figure 11:
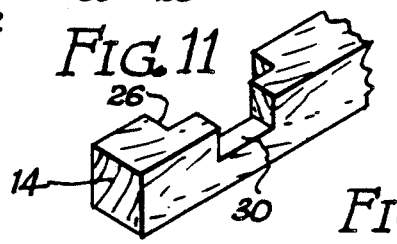
FIG. 11 is an isometric view of the notched area of a typical slat.

The pieces used to construct the wine rack are illustrated in FIG. 10. For each length dimension, the lath has its exact counterpart as a slat. There are thus four of the large laths and slats, eight of the middle-sized laths and slats, and eight of the small laths and slats. And, as can be seen by counting the butt ends of the post from FIG. 1, there are seventeen of each of the posts 16 and 18. However, because the shortest laths are identical to the posts 16 in the wine rack example, there would just be a combined total of 25 of those.

Figure 13:
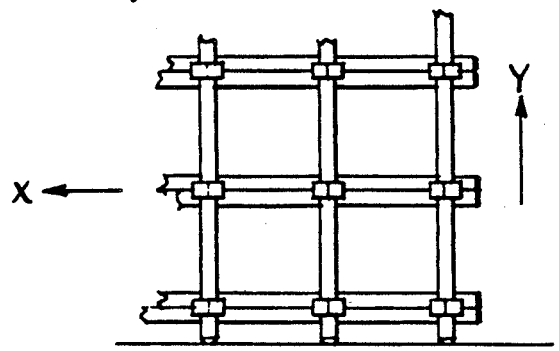
FIG. 13 illustrates the lattice construction as it would appear if it were not rotated 45 degrees as illustrated in FIG. 1 for a wine rack.

In constructing the rack, although obviously it can be done by hand, a simple way utilizing a framing jig involves first laying out all the laths (X direction) in place for the entire wine rack, possibly with the rack in its upright position as shown in FIG. 13. Then the slats 14 are all put in place, or put in place slightly displaced from their final position to permit the insertion of the posts 16. The posts 16 are slid in place and the respective slats 14 pressed into place in the notches 32 of the posts. Finally, nothing remains but to slide all seventeen of the key posts into place.

When the joint is completed, there is a void 34 which is defined by the bottom parts of the openings 28 and 24, beneath the solid key post 18 and between the sides of the slats 14 adjacent the half-notches. To eliminate this void, the slats could be cut as shown in FIG. 12, with the otherwise full-notch 22 instead being defined by an E-cut 36, which leaves a tongue of wood 38, two of which fill the void 34. This results in a somewhat stronger joint.

In addition to the E-cut 36 in the slat, there are other configurations which would result in the internal void being filled, which will not be expanded upon there.

In either of the joint embodiments illustrated, the wine rack of the instant disclosure, as indicated above, is very complex in its conception, at least for a wine rack, but is at the same time conceptually extremely simple in its implementation. When made from oak or other hardwood, it can be finely milled and finished to produce a very strong structure as well as a very attractive piece of furniture which appears to be of relatively intricate construction for the price. At the same time, it is extremely strong and durable, capable of loads, wall mounting, etc. The prototype wine rack, made of three-quarter inch nominal dimension soft wood, will withstand the full weight of a person standing on it without any sign of distortion or weakening. In fact, the construction is so strong that the same basic construction can be used to form structural members as described below.

By increasing the six of the members—for example, from three-quarter inch nominal stock in the model to six-inch or eight-inch square beams—large, strong cubicle frames or non-cube shaped box-like spaces, could be defined for an endless variety of uses. FIG. 13 illustrates the basic modular cubic construction that would expand into a variety of useful lattice structures. The stock need not be square, but could be rectangular instead. Additionally, the cubes formed by the stock could be rectangular rather than cubic in two or three dimensions, or the cubic units could be parallelograms rather than cubic or rectangular. Although in some instance strength could be sacrificed, and the interchangeability of the stock would be sacrificed, nonetheless for certain applications diamond-shaped or rectangular "cubes" might work out quite well.

The above description should make clear the details of construction of the joints, which is at the core of the invention. FIGS. 14 through 24, the descriptive numerals starting with number 40, and the written description from here to the end, pertain to the embodiments of the invention which are disclosed and claimed herein, and pertain to a support stand. The support stand in its most generic form comprises a support base 40, with an upwardly extending support post 42, and a joint 44 which connects and is defined by the support base and the post.

In the original, parent, application, a wine rack was claimed. In the first CIP application, a structural support, such as a beam or girder, was claimed, and in the second CIP an enclosure was claimed. The invention claimed herein is neither a lattice or a beam, or an enclosure, but is a rack having the described support base with the upright post 42, all connected with the joint 44, which is the paradigm joint of all the inventions in the series.

The support stand can be made into limitless different articles, several of which are disclosed and claimed herein. The basic rack, however, includes the elongated structural members 48, which are provided in pairs. Two pairs, 50 and 52, are crossed to produce the support base 40, and the third pair 54 creates the post 42. The joint 44, which is created from three orthogonally extended pairs, holds everything together.

In addition to this basic structure, in the embodiment shown in FIGS. 14 through 19 the support stand is used as a display "tree". At the ends of the legs 56 defined by the support base 40, are defined foot joints 58. These foot joints, also seen in FIG. 18, hold the elongated structural members of the legs together, and also space the legs off of the underlying surface 59 a uniform distance as illustrated in FIGS. 14 and 15.

The upright post 42 is held together by additional joints 60 which are spaced at intervals along the post as shown in FIGS. 14 and 15. These are essentially just large enough to hold 40, with an upwardly extending support post 42, and a joint 44 which connects and is defined by the support base and the post.

In the original, parent, application, a wine rack was claimed. In the first CIP application, a structural support, such as a beam or girder, was claimed, and in the second CIP an enclosure was claimed. The invention claimed herein is neither a lattice or a beam, or an enclosure, but is a rack having the described support base with the upright post 42, all connected with the joint 44, which is the paradigm joint of all the inventions in the series.

The support stand can be made into limitless different articles, several of which are disclosed and claimed herein. The basic rack, however, includes the elongated structural members 48, which are provided in pairs. Two pairs, 50 and 52, are crossed to produce the support base 40, and the third pair 54 creates the post 42. The joint 44, which is created from three orthogonally extended pairs, holds everything together.

In addition to this basic structure, in the embodiment shown in FIGS. 14 through 19 the support stand is used as a display "tree". At the ends of the legs 56 defined by the support base 40, are defined foot joints 58. These foot joints, also seen in FIG. 18, hold the elongated structural members of the legs together, and also space the legs off of the underlying surface 59 a uniform distance as illustrated in FIGS. 14 and 15.

The upright post 42 is held together by additional joints 60 which are spaced at intervals along the post as shown in FIGS. 14 and 15. These joints are essentially just large enough to hold the components of the post together and to permit the embedding of hanger hooks 62. These hooks are screwed orthogonally into the joints, as shown in FIG. 14, or, in an alternative embodiment illustrated in FIG. 16, the hooks are diagonally embedded.

Trees designed according to this construction are being sold by the inventor's company to suspend, at the point of purchase, the packaged products that the inventor is marketing.

FIGS. 20 through 22 disclose an additional rack-type embodiment with joints 64 and 66 which are defined at spaced intervals along the post 42, but in this instance, rather than terminating just outside the joint body, the structural members creating the joints extend horizontally in four orthogonally oriented directions to define four arms 68. In the illustrated embodiment, the rack is used for a cup rack, etc., and has depending hooks 70 which hold cups 72, for example. The arms 68 could be somewhat shorter than illustrated, and a number of levels other than two could be used.

FIG. 23 illustrates an embodiment in which the stand is made into a lamp, having a light structure 74, including a light bulb, a shade support and a shade. The lamp cord would ordinarily be threaded through an axial bore in the post 42 as in the construction of most lamps.

FIG. 24 illustrates yet another embodiment, similar to the cup rack embodiment of FIGS. 20 through 22 in that a single, uppermost joint 76 expands into horizontal arms 78. In this instance however, rather than having depending hooks, the arms each define a joint 80 at its distal end, so that an overlying panel 82 can be supported over the combination of the joints 80 and 76, and rest uniformly on the support structure. Ordinarily the panel 82 would be in the nature of a glass plate and the unit would be a coffee table.

Although it is intended that the support of FIG. 24 be strong enough that it would not need auxiliary supports, nonetheless it would be clearly quite possible to utilize vertical supports as indicated in phantom at 84 extending between the foot joints 58 and the arm joints 80. This would produce a very stable structure indeed.

The illustrated embodiments are exemplary in nature, as clearly a variety of other products and devices could be made with the same general cross base support and central upright post construction, utilizing the basic lattice/joint construction described herein. Inherent in the type of construction used is simplicity, natural physical strength, and the aesthetic qualities that make it ideal in the creation of such products.

I claim:

1. A support stand comprising:
   (a) A three-dimensional joint defining orthogonal X, Y, and Z directions comprising:
      (i) a plurality of elongated structural member pairs formed into an X-directional parallel contiguous pair, a Y-directional parallel contiguous pair, and a Z-directional parallel contiguous pair;
      (ii) said parallel contiguous pairs intersecting one another to define said joint between six elongated structural members such that said joint has:
         (1) three elongated structural members that are only fully notched, said full notch being of length substantially equal to twice the thickness of said structural members and of depth substantially equal to half the thickness of said structural members such that when paired with an oppositely-directed full notch defines a paired pass-through opening for a pair of members which pair will snugly fit into the paired pass-through opening when inserted orthogonally therethrough;
         (2) two of said members having similar full notches and also having an additional half notch, said half notch being formed at 90 degrees to the full notch and substantially at mid-span of the full notch; and,
         (3) the sixth elongated structural member having no notches at said joint and being the key post that holds the remaining five members together as a joint;
      (iii) said joint comprising an interlocking joint held together by the interlocking configurations of the elongated structural members themselves such that said lattice is rigid and completely integral without the use of blocks or sockets at the joints; and,
   (b) two of said parallel contiguous pairs each extending mutually orthogonally outward horizontally beyond said joint to define a cross support base having four extended legs; and,
   (c) the third of said contiguous pairs extending upright from said support base well beyond said joint to define a vertical support post.

2. Structure according to claim 1 wherein said joint spaces said support base above an underlying surface, and including four additional ones of said joints defined as integral parts of said four extending legs, respectively, such that the lowermost extension of all five of said joints substantially defines a plane so that said support base rests stably on an underlying surface.

3. Structure according to claim 1 wherein said vertical support posts include restraining means spaced therealong to hold together the two elongated structural members defining said post.

4. Structure according to claim 3 wherein said restraining means comprises at least one additional one of said joints spaced above said base.

5. Structure according to claim 4 wherein said at least one additional one of said joints spaced above said base has two of the parallel contiguous structural member pairs thereof extending out horizontally to define four orthogonal horizontal support arms.

6. Structure according to claim 4 wherein said support arms mount embedded hooks to define a hanging rack.

7. Structure according to claim 5 wherein said at least one of said joints is the uppermost joint on said support post, and including a horizontal panel supported on said horizontal support arms to define a table top.

8. Structure according to claim 7 wherein the horizontal support arms each defines one of said joints near the end thereof for a total of four arm-defined joints, and said uppermost joint and said arm-defined joints substantially define an overlying plane and stably support said overlying panel.

9. Structure according to claim 4 and including a plurality of hooks embedded in said at least one additional one of said joints to define a hanging tree.

10. Structure according to claim 1 wherein said support post supports a light and said support stand comprises a lamp.

11. Structure according to claim 10 wherein said vertical support post includes at least one additional one of said joints spaced above said base to hold together the two elongated structural members defining said post.

12. Structure according to claim 1 wherein some of said elongated structural members having notches therein have additional stock left in the notches to fill the void that would otherwise lie internally of each joint so that a totally solid joint is produced.

13. Structure according to claim 12 wherein each of the full notches in each of said elongated structural members that is full notched and has said additional half notches is E-shaped to define said additional stock to fill the void that would otherwise be produced.

* * * * *